United States Patent
Ai

(10) Patent No.: US 7,264,567 B2
(45) Date of Patent: Sep. 4, 2007

(54) WEDGE LOADING MECHANISM FOR TRACTION DRIVES

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 11 days.

(21) Appl. No.: 10/670,408

(22) Filed: Sep. 25, 2003

(65) Prior Publication Data

US 2004/0067811 A1    Apr. 8, 2004

Related U.S. Application Data

(60) Provisional application No. 60/414,134, filed on Sep. 27, 2002.

(51) Int. Cl.
*F16H 13/06* (2006.01)

(52) U.S. Cl. ............ 475/184; 475/194; 475/195; 475/197; 475/165; 475/168; 475/179; 475/347; 192/38; 192/44; 192/45

(58) Field of Classification Search ............ 475/183, 475/193, 194, 195, 197, 162, 165, 168, 178, 475/179, 180, 331, 904, 346, 347; 384/581, 384/582; 476/61; 192/38, 44, 45
See application file for complete search history.

(56) References Cited

U.S. PATENT DOCUMENTS

| | | | |
|---|---|---|---|
| 1,093,922 A | | 4/1914 | Dieterich |
| 2,407,975 A | * | 9/1946 | Christian .................... 475/347 |
| 3,048,058 A | * | 8/1962 | Chery ......................... 475/197 |
| 3,375,739 A | | 4/1968 | Nasvytis |
| 3,380,312 A | | 4/1968 | Barske |
| 3,475,993 A | | 11/1969 | Hewko |
| 3,945,270 A | | 3/1976 | Nelson et al. |
| 4,116,293 A | * | 9/1978 | Fukui ......................... 180/255 |
| 4,157,668 A | * | 6/1979 | Fukuma et al. ............. 475/159 |
| 4,481,842 A | | 11/1984 | Nelson |
| 4,555,963 A | | 12/1985 | Nelson |
| 4,709,589 A | | 12/1987 | Kraus |
| 5,584,774 A | * | 12/1996 | Fini, Jr. ...................... 475/183 |
| 5,688,201 A | * | 11/1997 | Zhou .......................... 475/183 |
| 6,095,940 A | | 8/2000 | Ai et al. |
| 6,689,008 B2 | * | 2/2004 | Ai ............................. 475/193 |

FOREIGN PATENT DOCUMENTS

| | | |
|---|---|---|
| EP | 0877181 A1 | 11/1996 |
| EP | 0856462 A3 | 8/1999 |
| GB | 2185084 A * | 7/1987 |
| JP | 09119553 | 11/1998 |
| WO | WO0192759 A1 | 12/2001 |
| WO | WO 03/064891 A1 * | 8/2003 |

* cited by examiner

*Primary Examiner*—David D. Le
(74) *Attorney, Agent, or Firm*—Polster, Lieder, Woodruff & Lucchesi

(57) ABSTRACT

A wedge loading mechanism for an eccentric planetary traction drive in which a roller having a flexibly mounted shaft is positioned between two raceways forming a convergent wedge. Rotation of either of the two raceways wedges the roller within the convergent wedge squeezing the roller between the two raceways thereby transmitting rotational motion and torque between the two raceways. The flexibly mounted shaft generates differences between an effective supporting stiffness of the roller and an contact effective stiffness at the points where the roller contacts the two raceways. The difference in the effective stiffness allow the roller to operate efficiently at smaller convergent wedge angles.

14 Claims, 4 Drawing Sheets

$$\frac{K_\delta}{K_R} = \mu \sin\delta - 2\sin^2\left(\frac{\delta}{2}\right)$$

US 7,264,567 B2

WEDGE LOADING MECHANISM FOR TRACTION DRIVES

CROSS-REFERENCE TO RELATED APPLICATIONS

This application is related to U.S. Provisional Patent Application No. 60/414,134 filed Sep. 27, 2002 from which priority is claimed.

STATEMENT REGARDING FEDERALLY SPONSORED RESEARCH OR DEVELOPMENT

Not applicable.

BACKGROUND OF THE INVENTION

1. Field of the Invention

This invention relates in general to a wedge loading mechanism for traction drives, and, more particularly, to a wedge loading mechanism having an increased normal force for the contact points of a loading roller wedged between two raceways that form a convergent wedge.

2. Description of Related Art

Traction drives use frictional force to transmit torque and power. Because the power is transmitted between two smooth surfaces, often through a thin layer of lubricant, a traction drive possesses unique characteristics that are not readily attainable by gear drives. These characteristics include quietness, high-efficiency, high rotational accuracy, and zero-backlash.

Generating adequate normal force at the contact is essential for traction drives. Various loading mechanisms have been proposed. These mechanisms have lead to a host of designs. Perhaps the simplest means to generate torque responsive load is using eccentric planetary drives as was disclosed by Dieterich U.S. Pat. No. 1,093,922 in 1914. Over the years, various improvements have been proposed. See for example, U.S. Pat. Nos. 3,945,270, 4,481,842, 4,555,963, and foreign patent numbers JP10-311398, EP 0,856,462 A2. However, these devices sometimes tend to overload rollers and raceways when the wedge angle is small resulting in inefficient transmission of torque and power.

A common practice is to use tapered surfaces along the axial direction. By moving these surfaces axially, a radial displacement and thus normal force are generated. Examples of such designs are disclosed in U.S. Pat. Nos. 3,475,993 and 3,375,739.

Since the envelopes of the tapered surfaces in most designs do not necessarily converge to a common point, this results in a so-called spin motion at contacting surfaces. The spin motion not only offsets the high-efficiency otherwise provided by the traction drive, but also causes component wear and high break away torque.

Recently, a design of zero-spin planetary traction drive has been proposed by Ai as disclosed in the U.S. Pat. No. 6,095,940. This design employs the on-apex concept similar to that of tapered roller bearings. Two rows of planetary rollers are used to balance the internal axial force on the planetary rollers. This design offers torque actuated loading mechanism and greater torque capability.

The cylindrical planetary traction drive is also able to achieve zero-spin motion. However, generating sufficient normal force at the contacts has been a challenge. Designs proposed in the past have offered various means to pre-load the drive either by mechanically deforming the outer rings or by thermal assembling the drive. The pre-load generated by such means, in general, can not be adjusted during operation. For partial load application, traction drives are unnecessarily overloaded. This has negative impacts on transmission efficiency and service life.

As mentioned above, wedge loading provides a simple means to generate normal force. Most of the wedge loading arrangements in prior art were based on a specified friction coefficient, requiring a certain wedge angle corresponding to the friction coefficient. This imposes a restriction to the traction drive design.

Therefore, it is desirable to provide a simple loading mechanism that relieves the restriction on wedge angles, thereby giving improved flexibility for traction drive design.

SUMMARY OF THE INVENTION

The present invention relates to a wedge loading mechanism for traction drives, and, more particularly, to a wedge loading mechanism in the form of a uniquely designed roller wedged between two races that provides increased normal loads at the contact points between the loading roller and the races.

An eccentric planetary traction drive often contains a loading roller that is wedged between an outer ring member and an eccentrically located sun roller member. Either the ring member or the sun member can serve as the driving member. As the driving member rotates, it drives the loading roller into the converged wedge formed between outer ring and the sun roller, thus generating normal forces at contacts between the loading roller and the sun roller and between the loading roller and the outer ring.

To ensure an adequate normal load at the contacts, the following relationship is often required, $$\tan\frac{\delta}{2} \leq \mu \qquad (1)$$

where $\delta$ is the wedge angle (FIG. 1(b)) and $\mu$ is the maximum available friction coefficient at the contacts.

For traction drives restricted to operate under small wedge angles, the drive is unnecessarily overloaded. This could lead to a low transmission efficiency and short service life.

To obtain the highest possible efficiency of the traction drive, the wedge angle $\delta$ has to be large enough to make $$\tan\frac{\delta}{2}$$

close to the maximum available friction coefficient $\mu$. Ideally, it requires, $$\delta = 2 \cdot \arctan \mu \qquad (2a)$$

In the past, however, this may put an undesirable geometry constraint on previous traction drive designs.

In accordance with the new present invention, for eccentric planetary traction drive it can be shown (FIG. 1(b)) that wedge angle $\delta$ is determined by the internal geometry ($R_1$, $R_2$, and e) of a traction drive and by the azimuth position a of the loading roller as, $$\delta = \arccos\left[\frac{(R_1+r)^2 + (R_2-r)^2 - e^2}{2(R_1+r)(R_2-r)}\right] \quad (3a)$$

where $R_1$ is the radius of the first cylindrical raceway of the sun roller member;

$R_2$ is the radius of the second cylindrical raceway of the outer ring member;

e represents the eccentricity between the first cylindrical raceway and the second cylindrical raceway; and r is the effective radius of the loading roller at this azimuth position and is expressed in terms of a as:

$$r = \frac{R_2^2 - R_1^2 - e^2 + 2eR_1\cos\alpha}{2(R_2 + R_1 - e\cos\alpha)} \quad (3b)$$

As can be appreciated in the following example, for a normal friction coefficient of μ=0.06, the optimal wedge angle is about δ=7 degrees. If it is assumed that $R_1$=10 mm and $R_2$=50 mm and e=10 mm, then the required azimuth position of the loading load is at about α=18 degrees. This can be excessive for some applications particularly for applications where the drive is used in bidirectional operation and a single loading roller is used for loading in both directions. In addition, traction drives designed under constraint of equation (1) have no overload protection. The normal load at the contacts continues to increase in proportion to the traction force at contact as the applied torque increases.

The present invention provides a loading mechanism that allows for a traction drive to operate under a small wedge angle without having the traction drive become unnecessarily loaded thereby improving the efficiency of the traction drive. The present traction drive also provides a loading mechanism that improves the dynamic stability of the traction drive and which offers protection when the drive is overloaded.

DESCRIPTION OF THE DRAWINGS

Corresponding reference characters indicate corresponding parts throughout the several views of the drawings.

DETAILED DESCRIPTION OF THE INVENTION

Figure 3:
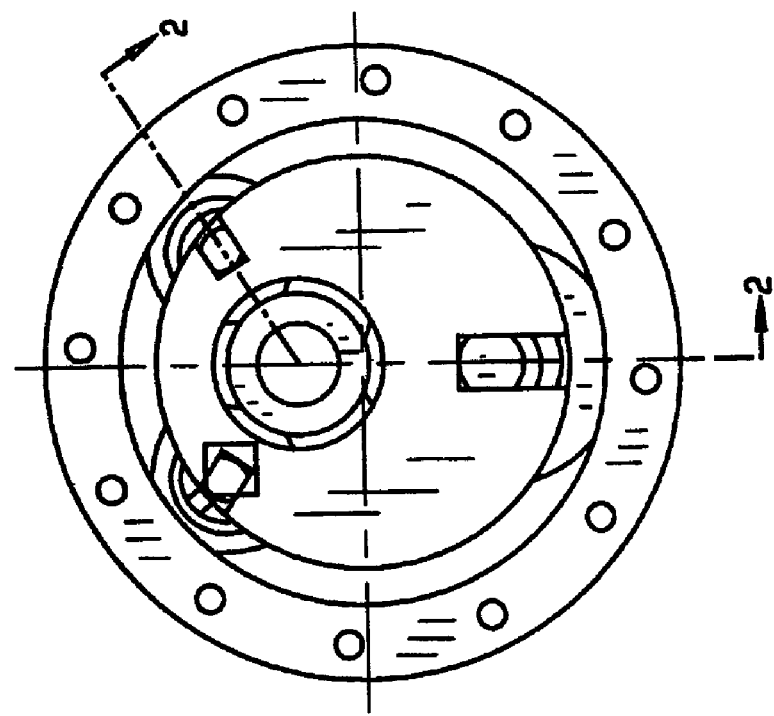
FIG. 3 is a generally transverse sectional view of the typical eccentric planetary traction drive.
Figure 2:
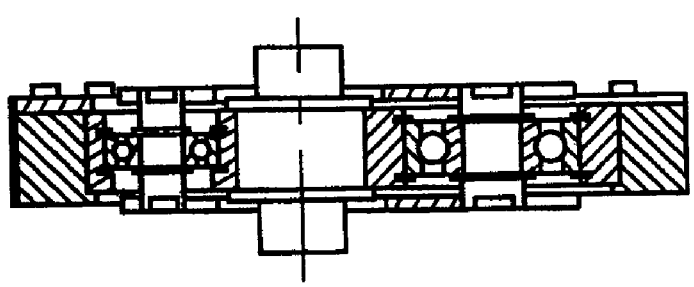
FIG. 2 is a generally longitudinal sectional view of the typical eccentric planetary traction drive.
Figure 1:
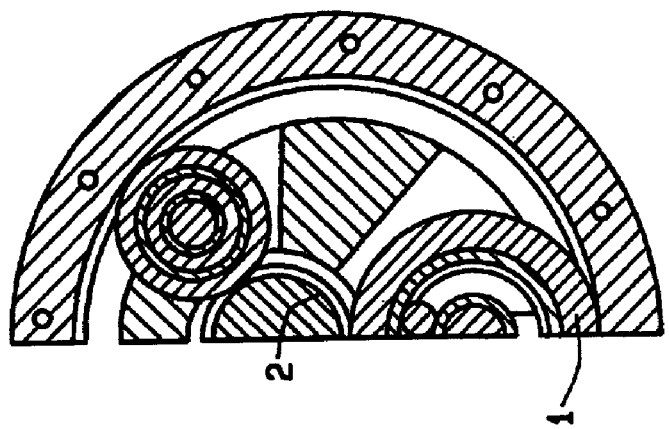
FIG. 1 is a front view of a typical eccentric planetary traction drive that would incorporate the present invention.
Figure 4:
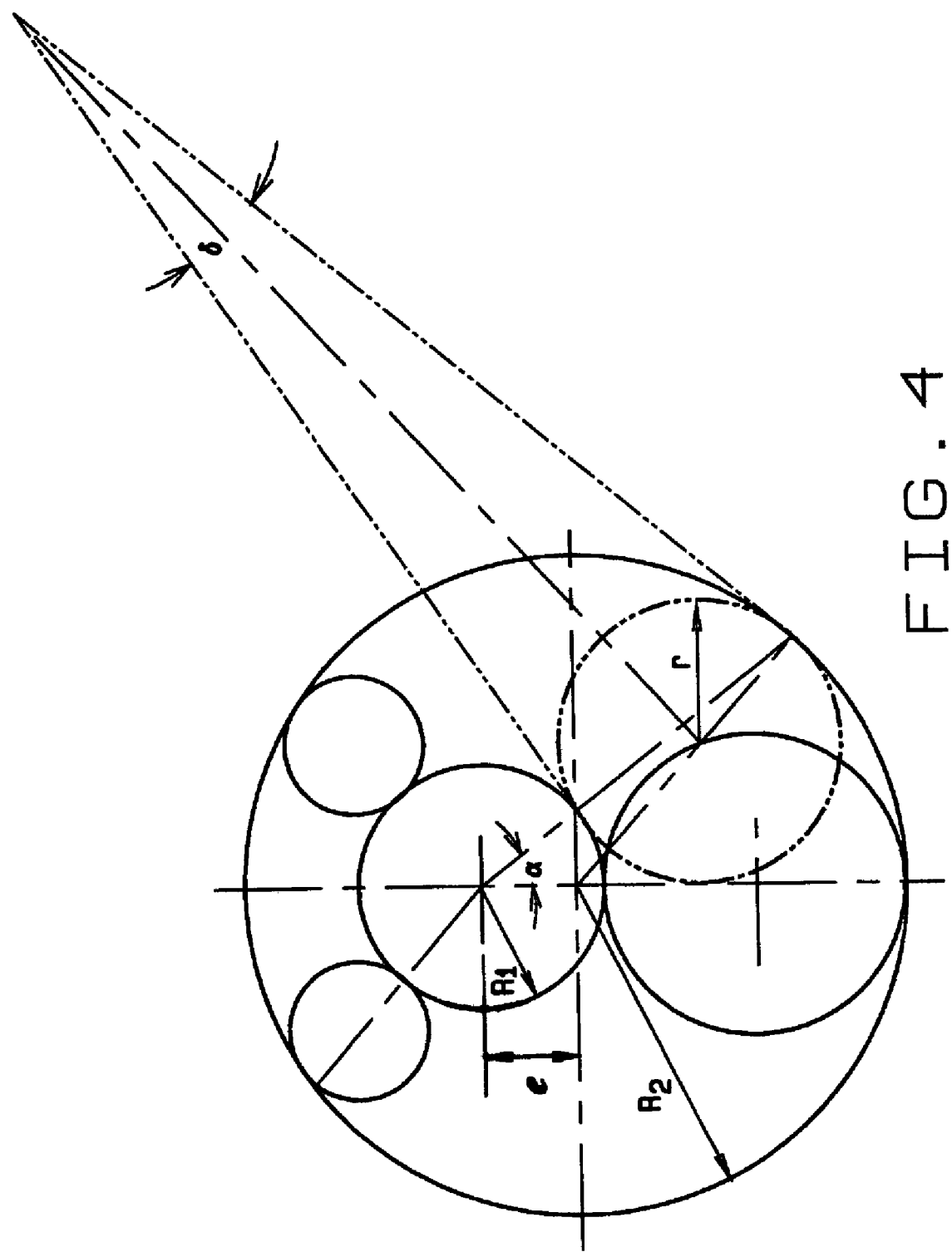
FIG. 4 is a diagram showing the geometric relationship between the wedge angle and the rollers in the form of an eccentric planetary traction drive embodiment of the present invention.
Figure 5:
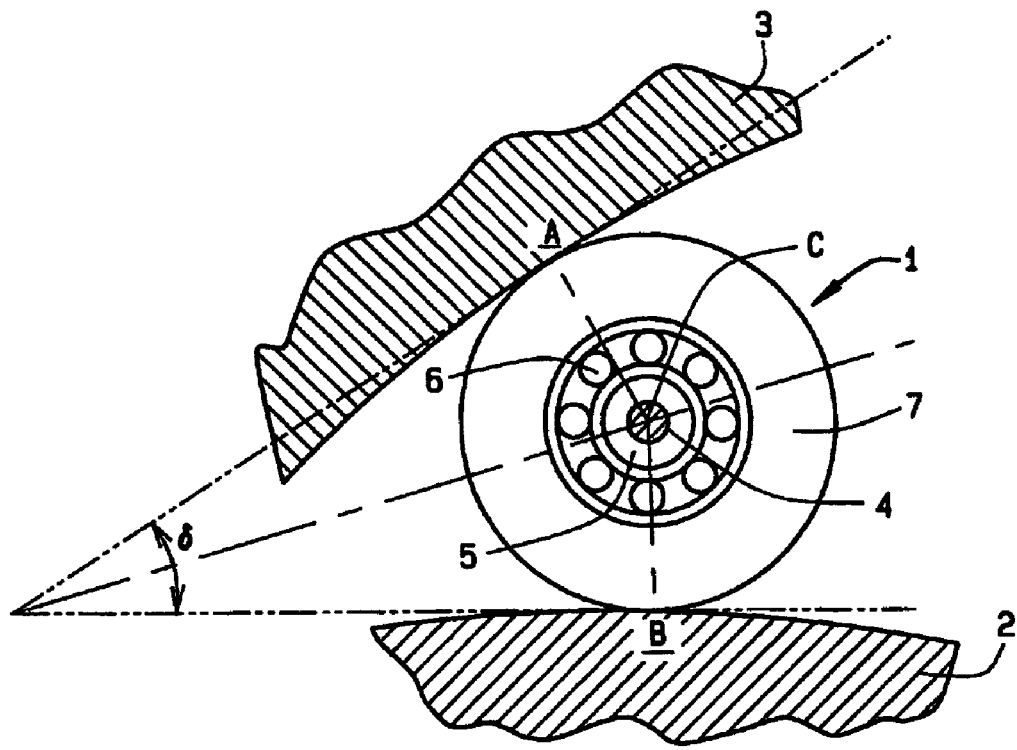
FIG. 5 is a diagram showing the present invention of a wedge loading mechanism in the form of an eccentric planetary traction drive embodiment of the present invention.
Figure 6:
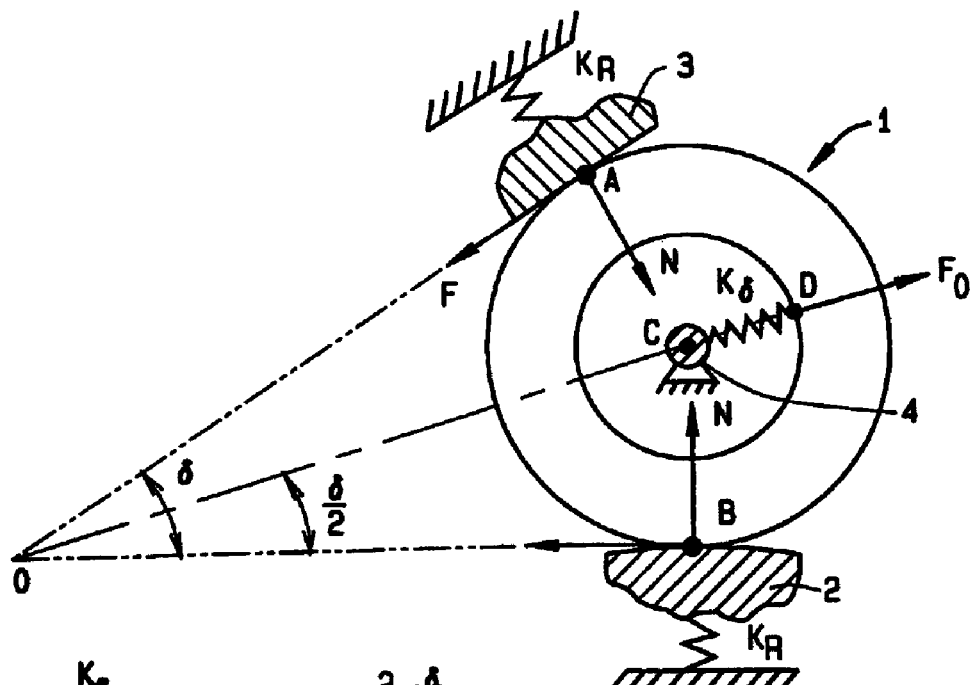
FIG. 6 is a force diagram showing the relationship between the contact load and the geometry/traction coefficient of the present invention.

Now, referring to the drawings, FIG. 1, FIG. 2, and FIG. 3 depict a typical eccentric planetary traction drive having an eccentric sun roller and three planetary rollers, at least one of which is a loading planetary roller. In this typical traction drive, the present invention of a wedge loading mechanism 1 is a planetary roller that acts as the loading roller in this typical eccentric planetary traction drive. The wedge loading mechanism 1 is located between a first raceway 2, and a second raceway 3. The wedge loading mechanism 1 comprises a supporting shaft 4 (FIG. 5), a rubber insert 5, a bearing 6, and a loading roller ring 7. Shaft 4 is fixed to the wedge loading mechanism 1. The wedge loading mechanism 1 is positioned between and in contact with the first and second raceways 2 and 3. In FIG. 6, the tangential line OA at contact point A between the second raceway 3 and the wedge loading mechanism 1 lies at an angle of δ with respect to the tangential line OB at contact point B between the first raceway 2 and the wedge loading mechanism 1. Thus the two tangent lines form a converged wedge AOB.

Raceway 2 is the driving member and the contact point B on raceway 2 has a tendency to move along the tangent line BO toward point O with respect to the contact point B on the loading roller ring 7 during the operation of the wedge mechanism 1. A friction force F is thus generated at contact point B. The friction force tends to rotate the roller ring 7, making the contact point A on the loading roller ring 7 move along the tangent line OA from point O with respect to the corresponding contact point A on the second raceway 3. Similarly, a friction force F at contact A is generated. The friction forces at contact points A and B both drives the loading roller ring 7 further into the converged wedge, making the loading roller ring 7 push firmly against the raceways at the contact points A and B and against the supporting shaft 4.

The friction forces F at contact points A and B are balanced by normal contact forces N at contact points A and B and a supporting force $F_0$ at supporting shaft 4.

Figure 7:
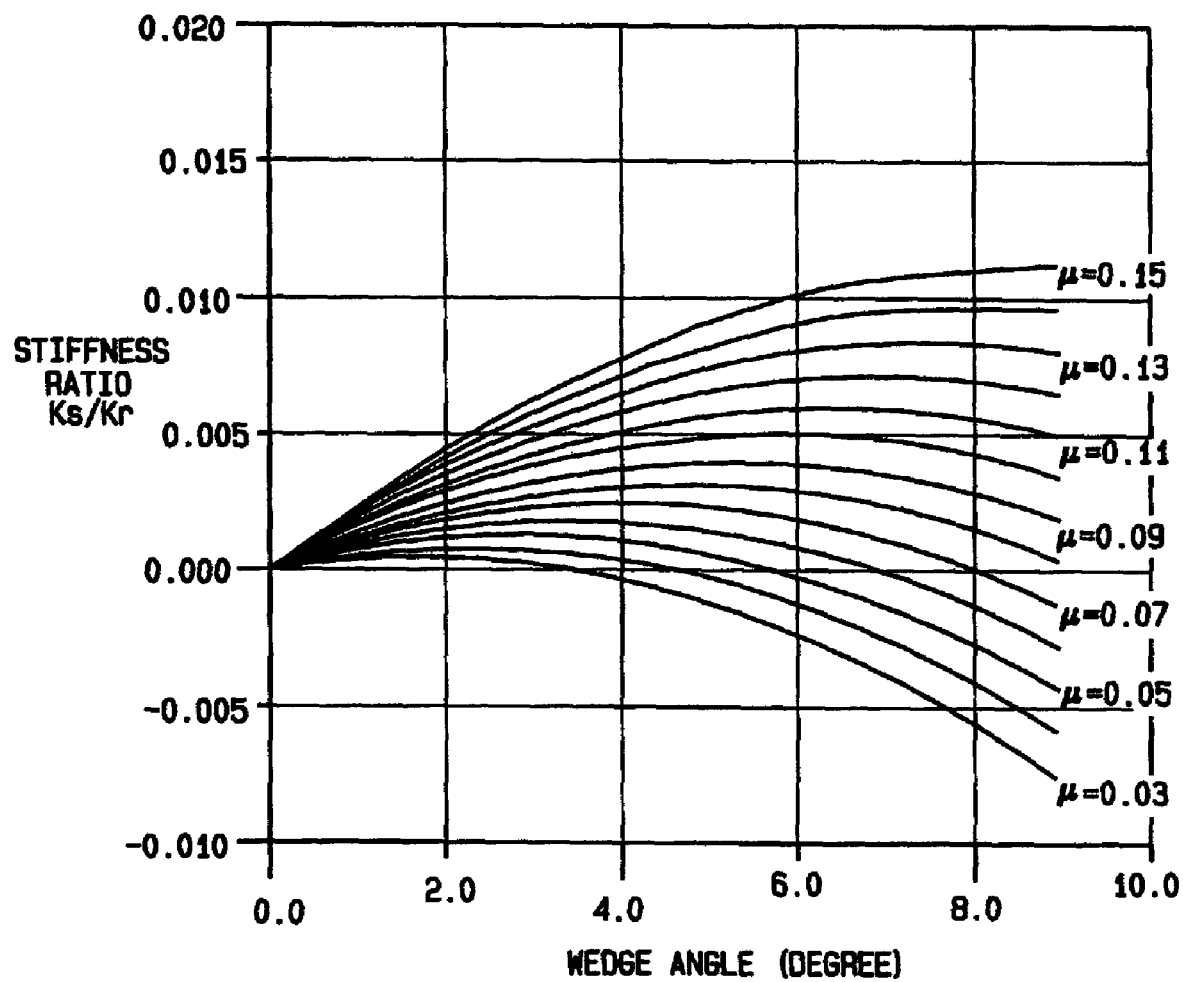
FIG. 7 is a chart showing the relationship between the effective stiffness ratio and the wedge angle of the present invention.

The overall deflection, including surface and structural deflections, normal to the contact surface under normal load can be characterized by an effective stiffness at the contact. The effective stiffness at contact points A and B is denoted by $K_R$ and the effective stiffness at the contact area between the loading roller ring 7 and supporting shaft 4 is denoted by $K_S$. Thus as the loading roller ring 7 is driven by the friction forces F at contact points A and B into the converged wedge along OC, the normal contact forces N and supporting contact $F_0$ are estimated as:

$$F_0 = K_S \cdot l \quad (4)$$

$$N = K_R \cdot l\sin\frac{\delta^*}{2} \quad (5)$$

Where $$\sin\frac{\delta^*}{2}$$

is a mean value when δ is a variable that varies with l, that is, $$\sin\frac{\delta^*}{2} = \frac{1}{l}\int_0^l \sin\frac{\delta}{2} dl \qquad (5a)$$

and where l is the distance that the center C of loading roller ring 7 (not the center of the supporting shaft 4) moves along line $\overline{OC}$ under the friction forces at contact points A and B. FIG. 7 is a chart showing the relationship between the stiffness ratio $K_S/K_R$ and the wedge angle $\delta^*$.

The operating friction coefficient at the contact is $\mu_0$, the friction force is expressed as $$F = \mu_o \cdot N \qquad (6)$$

Under static equilibrium conditions, $$\frac{F_0}{2N} = \mu_o \cdot \cos\frac{\delta}{2} - \sin\frac{\delta}{2} \qquad (7)$$

This equation can be expressed in terms of effective stiffness $K_S$ and $K_R$ by substituting equations (4) and (5) into this equation.

$$\frac{K_S}{K_R} = 2\left(\mu_0 \cos\frac{\delta}{2} - \sin\frac{\delta}{2}\right)\sin\frac{\delta^*}{2} \qquad (8a)$$

In cases where variation in δ is small, then $\delta \propto \delta^*$ and equation (8a) becomes $$\frac{K_S}{K_R} = \mu_o \cdot \sin\delta - 2\sin^2\left(\frac{\delta}{2}\right) \qquad (8)$$

FIG. 7 shows effective stiffness ratio $K_S/K_R$ as a function of wedge angle δ for different operating friction coefficients $\mu_0$.

A zero stiffness ratio at a non-zero wedge angle indicates no supporting force $F_0$, which leads to the following condition $$\delta = 2 \cdot \arctan \mu_0 \qquad (2b)$$

Negative stiffness ratio means direction change in force $F_0$. In other words, shaft 4 is now pushing the loading roller ring 7 into the converged wedge.

It can be appreciated that a traction drive with the current wedge loading mechanism 1 can be operated under any small wedge angle δ while still having the traction drive being operated at or close to the maximum available friction coefficient μ so long as the stiffness ratio is appropriately chosen. That is, $$\frac{K_S}{K_R} = 2\left(\mu_0\cos\frac{\delta}{2} - \sin\frac{\delta}{2}\right)\sin\frac{\delta^*}{2} \le \mu\sin\delta - 2\sin^2\left(\frac{\delta}{2}\right) \qquad (9)$$

The proper support stiffness $K_S$ of the wedge loading mechanism 1 is achieved through rubber insert 5 (FIG. 5), bearing 6, and shaft 4. Other means are also possible. For instance, the supporting shaft can be mounted to the traction drive through deflectable mounting devices such as springs, and/or washers. In this case, the loading roller ring 7 may take the form of a solid roller.

The flexible support of the wedge loading mechanism 1 can also serve as a device to provide a necessary force pushing loading roller into the wedge contacts thus to improve system dynamic stability.

With predetermined allowable travel range of the loading roller, the wedge loading mechanism 1 can also serve as an overload protecting device. When driving torque is at its maximum allowable level, the wedge loading mechanism 1 is pushed into the wedge toward the limit of the predetermined travel range. Any additional increase in torque cannot further push the wedge loading mechanism 1 into the wedge, thus limiting the maximum available friction forces. Under such conditions, slippage occurs at contacts between the wedge loading mechanism 1 and raceways 2 and 3.

While the above description describes various embodiments of the present invention, it will be clear that the present invention may be otherwise easily adapted to fit any configuration where a wedge mechanism for traction drives may be utilized. As various changes could be made in the above constructions without departing from the scope of the invention, it is intended that all matter contained in the above description or shown in the accompanying drawings shall be interpreted as illustrative and not in a limiting sense.

What I claim is:

1. A wedge loading mechanism for a planetary traction drive comprising:
    a roller positioned between and in frictional contact with two raceways that form a convergent wedge such as to communicate motion between the two raceways;
    wherein the roller includes a flexible mounting having a preselected stiffness ratio $K_S/K_R$;
    wherein the wedge loading mechanism can be operated under any small wedge angle δ while the traction drive operates at or close to a maximum available friction coefficient μ as characterized by:

$$\frac{K_S}{K_R} = 2\left(\mu_0\cos\frac{\delta}{2} - \sin\frac{\delta}{2}\right)\sin\frac{\delta*}{2} \le \mu\sin\delta - 2\sin^2\left(\frac{\delta}{2}\right).$$

2. The wedge loading mechanism of claim 1, the roller comprising a loading roller ring and wherein the flexible mounting comprises a supporting shaft, an elastic insert, and a bearing.

3. The wedge loading mechanism of claim 2 where, as the loading roller ring is driven by friction forces F at contact points A and B into a converged wedge between the two raceways, a normal contact force N and a supporting force $F_0$ are characterized by:

$$N = K_R \cdot l\sin\frac{\delta}{2} = K_R \int_0^l \sin\frac{\delta}{2} dl$$

where l is the distance that the center of loading roller ring moves within the converged wedge in response to the friction forces at contact points A and B, and $\delta$ is the wedge angle between the two raceways measured at the contact points.

4. The wedge loading mechanism of claim 3 where an operating friction coefficient at a contact is $\mu_o$ and the supporting force under static equilibrium conditions is characterized by:

$$\frac{F_0}{2N} = \mu_o \cdot \cos\frac{\delta}{2} - \sin\frac{\delta}{2}.$$

5. The wedge loading mechanism of claim 4 wherein under static equilibrium conditions an effective stiffness ratio between $K_S$ and $K_R$ as characterized by:

$$\frac{K_S}{K_R} = 2\left(\mu_0\cos\frac{\delta}{2} - \sin\frac{\delta}{2}\right)\sin\frac{\delta^*}{2} \leq \mu\sin\delta - 2\sin^2\left(\frac{\delta}{2}\right)$$

where $\mu$ is the maximum available friction coefficient at the contacts.

6. The wedge loading mechanism of claim 5 where in the situation where the stiffness ratio has a negative value, there is a direction change in the force $F_0$ indicating the loading roller ring being pushed into the converged wedge.

7. A wedge loading mechanism for a planetary traction drive comprising:
a roller positioned between and in frictional contact with two raceways that form a convergent wedge to communicate motion between the two raceways, wherein the roller includes a flexible mounting that biases a center of the roller to a center of a fixed support shaft, thereby pushing and pulling the roller into and out of the convergent wedge so that the wedge loading mechanism can be operated under any small wedge angle $\delta$ while the traction drive operates at or close to a maximum available friction coefficient $\mu$;
wherein the flexible mounting has a preselected stiffness ratio $K_S/K_R$ characterized by:

$$\frac{K_S}{K_R} = 2\left(\mu_0\cos\frac{\delta}{2} - \sin\frac{\delta}{2}\right)\sin\frac{\delta*}{2} \leq \mu\sin\delta - 2\sin^2\left(\frac{\delta}{2}\right).$$

8. The wedge loading mechanism of claim 7, wherein the flexible mounting includes a predetermined travel range that limits an operating friction coefficient $\mu_0$ at or close to the maximum available friction coefficient $\mu$.

9. The wedge loading mechanism of claim 7, wherein the flexible mounting biases the center of the roller to the center of the fixed support shaft with tangential friction forces F at contact points between the roller and the two raceways balanced by normal contact forces N at the contact points and a supporting force $F_0$ at the supporting shaft.

10. A method of transmitting rotational motion and torque within a traction drive device comprising the steps of:
providing a flexibly mounted wedge loading mechanism having a predetermined stiffness ratio $K_S/K_R$ that is a function of a wedge angle $\delta$ for different operating friction coefficients $\mu_0$, characterized by:

$$\frac{K_S}{K_R} = 2\left(\mu_0\cos\frac{\delta}{2} - \sin\frac{\delta}{2}\right)\sin\frac{\delta^*}{2} \leq \mu\sin\delta - 2\sin^2\left(\frac{\delta}{2}\right);$$

installing the wedge loading mechanism into the traction device, the traction drive having a sun roller member within an outer ring member such that the sun roller member is eccentric to the outer ring member and a circumferential wedge gap is formed between the sun roller member and the outer ring member and the wedge loading mechanism is located within the wedge gap;
installing a planetary roller member into the wedge gap such that the planetary roller member is between and in contact with the sun roller member and the outer ring member; and
wedging the wedge loading mechanism between the outer ring member and the sun roller member by rotation of at least one of either the sun roller member or the outer ring member such that rotation and torque is transmitted from the outer ring member and the sun roller member.

11. A wedge loading mechanism for a planetary traction drive comprising:
a roller positioned between and in frictional contact with two raceways that form a convergent wedge such as to communicate motion between the two raceways, wherein the roller includes a flexible mounting with a predetermined travel range that limits the operating friction coefficient $\mu_0$ at or close to a maximum available friction coefficient $\mu$;
wherein the flexible mounting has a preselected stiffness ratio $K_S/K_R$ characterized by:

$$\frac{K_S}{K_R} = 2\left(\mu_0\cos\frac{\delta}{2} - \sin\frac{\delta}{2}\right)\sin\frac{\delta*}{2} \leq \mu\sin\delta - 2\sin^2\left(\frac{\delta}{2}\right).$$

12. A method of transmitting rotational motion and torque within a traction drive device having an outer ring and a sun roller eccentric to the outer ring thereby defining a circumferential wedge gap, the method comprising the steps of:
providing a flexibly mounted wedge loading mechanism having a preselected stiffness ratio wherein the wedge loading mechanism can be operated under any small wedge angle $\delta$ while the traction drive operates at or close to a maximum available friction coefficient $\mu$ as characterized by:

$$\frac{K_S}{K_R} = 2\left(\mu_0\cos\frac{\delta}{2} - \sin\frac{\delta}{2}\right)\sin\frac{\delta^*}{2} \leq \mu\sin\delta - 2\sin^2\left(\frac{\delta}{2}\right);$$

and
installing wedge loading mechanism into the wedge gap such that the wedge loading mechanism is positioned between and in frictional contact with the outer ring and the sun roller such as to communicate rotational motion between the outer ring and the sun roller.

13. A wedge loading mechanism for a planetary traction drive comprising:
a roller positioned between and in frictional contact with two raceways that form a convergent wedge such as to communicate motion between the two raceways, wherein the roller includes a flexible mounting capable of pushing and pulling the roller into and out of the convergent wedge so that the wedge loading mechanism can be operated under any small wedge angle $\mu$ while the traction drive operates at or close to a maximum available friction coefficient $\mu$;

wherein the flexible mounting has a preselected stiffness ratio $K_S/K_R$ characterized by:

$$\frac{K_S}{K_R} = 2\left(\mu_0 \cos\frac{\delta}{2} - \sin\frac{\delta}{2}\right)\sin\frac{\delta*}{2} \leq \mu\sin\delta - 2\sin^2\left(\frac{\delta}{2}\right).$$

14. The wedge loading mechanism of claim 13, wherein the flexible mounting includes a predetermined travel range that limits an operating friction coefficient $\mu_0$ at or close to the maximum available friction coefficient $\mu$.

* * * * *

UNITED STATES PATENT AND TRADEMARK OFFICE
CERTIFICATE OF CORRECTION

PATENT NO. : 7,264,567 B2
APPLICATION NO. : 10/670408
DATED : September 4, 2007
INVENTOR(S) : Xiaolan Ai It is certified that error appears in the above-identified patent and that said Letters Patent is hereby corrected as shown below:

Col. 7, Line 3
  Add --$F_0 = K_s \cdot l$--

Col. 7, Line 5

Replace " $N = K_s \cdot l \sin\frac{\delta}{2} = K_s \int_0^l \sin\frac{\delta}{2} dl$ "

With -- $N = K_s \cdot l \sin\frac{\delta *}{2} = K_s \int_0^l \sin\frac{\delta}{2} dl$ --

Col. 9, Line 11
  Replace "µ"
  With --δ--

Signed and Sealed this

Sixteenth Day of September, 2008

JON W. DUDAS
*Director of the United States Patent and Trademark Office*